(12) United States Patent
Takizawa et al.

(10) Patent No.: US 6,347,270 B1
(45) Date of Patent: Feb. 12, 2002

(54) SPEED RATIO CONTROL DEVICE

(75) Inventors: Satoshi Takizawa, Yokohama; Masato Koga, Atsugi; Masatoshi Akanuma, Fujisawa; Mitsuru Watanabe; Shigeki Shimanaka, both of Hadano; Hiroyasu Tanaka, Zama; Junya Takayama, Oomiya, all of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/671,147

(22) Filed: Sep. 28, 2000

(30) Foreign Application Priority Data

Sep. 30, 1998 (JP) .............................. 11-280418
Sep. 30, 1999 (JP) .............................. 11-280362
Sep. 30, 1999 (JP) .............................. 11-280417

(51) Int. Cl.$^7$ .............................................. G06F 19/00
(52) U.S. Cl. ............................ 701/53; 477/34; 477/107
(58) Field of Search .............................. 703/53, 51, 52, 703/55, 56, 61; 180/197; 477/34, 37, 51, 107, 110

(56) References Cited

U.S. PATENT DOCUMENTS

| 5,873,802 A | 2/1999 | Tabata et al. .................. 477/96 |
| 5,921,889 A | 7/1999 | Nozaki et al. ............... 477/158 |
| 6,059,688 A | 5/2000 | Nozaki et al. ................. 477/97 |

FOREIGN PATENT DOCUMENTS

| DE | 197 43 725 | 4/1998 |
| JP | 10-89460 | 4/1998 |

*Primary Examiner*—Yonel Beaulieu
(74) *Attorney, Agent, or Firm*—Foley & Lardner

(57) ABSTRACT

A controller determines whether or not the vehicle dynamics controller is operating, and when it is determined that it is operating, a speed change operation by an actuator which changes over a gear position of the automatic transmission is prohibited. This speed change prohibition is continued for a predetermined time even when the vehicle dynamics controller has stopped. In this way, control performance of the vehicle dynamics controller is prevented from becoming unstable due to a speed change of the automatic transmission.

7 Claims, 11 Drawing Sheets

SPEED RATIO CONTROL DEVICE

FIELD OF THE INVENTION

The present invention relates to speed ratio control of an automatic transmission, and more particularly, to speed ratio control when a vehicle behavior control device is operating.

BACKGROUND OF THE INVENTION

A vehicle dynamics controller (VDC) is known in the art which controls yawing and rolling when a vehicle is running. The VDC increase the running stability of the vehicle by automatically adjusting the braking force of the vehicle wheels and engine output so that the yaw rate of the vehicle follows the target yaw rate decided based on the steering angle and vehicle speed. The yaw rate may also be controlled by controlling the traction force or changing the drive force distribution.

SUMMARY OF THE INVENTION

However, when the gear position of the automatic transmission is changed over when the VDC is operating, a torque fluctuation or speed fluctuation is caused by the speed change, and vehicle behavior control performance of the VDC may be impaired. A similar problem occurs if the gear position is changed over when a behavior control device other than the VDC which controls unstable behavior in the yaw direction and roll direction of the vehicle, is operating.

A control which prohibits speed change of an automatic transmission due to running conditions such as when the vehicle turns, is disclosed in JP-A-H10-89460 published by the Japanese Patent Office in 1998.

It is therefore an object of this invention to prevent loss of vehicle behavior control performance by prohibiting the speed change of an automatic transmission when a vehicle behavior control device is operating.

In order to achieve above object, the present invention provides a speed ratio control device for use with a vehicle provided with an automatic transmission and a behavior control device which controls either of yawing and rolling of the vehicle. The device comprises an actuator which changes a speed ratio of the transmission, and a microprocessor programmed to determine whether or not the vehicle behavior control device is operating, and prohibit a speed change operation by the actuator when the vehicle behavior control device is operating.

The details as well as other features and advantages of this invention are set forth in the remainder of the specification and are shown in the accompanying drawings.

DESCRIPTION OF THE PREFERRED EMBODIMENTS

Figure 1:
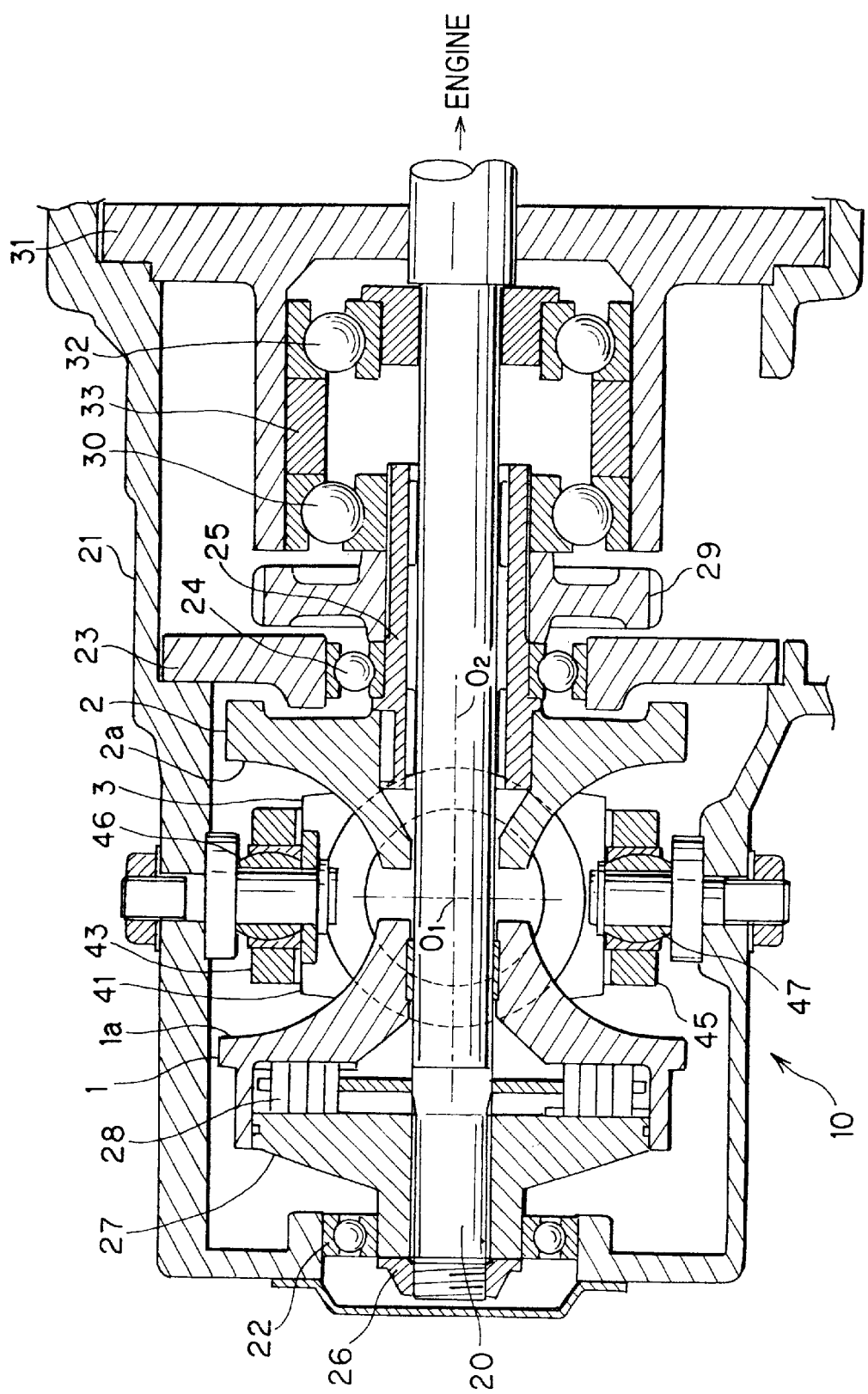
FIG. 1 is a longitudinal sectional view of a toroidal continuously variable transmission according to this invention.

Referring to FIG. 1 of the drawings, a toroidal continuously variable transmission (CVT) 10 according to this invention comprises an input shaft 20 connected to an engine, not shown, via a torque converter. One end of the input shaft 20 is supported by a bearing 22 in a transmission case 21, and the middle is supported via a bearing 24 and a hollow output shaft 25 in an intermediate wall 23 of the transmission case 21.

An input disk 1 is supported by the input shaft 20. An output disk 2 is supported by the output shaft 25. The input disk 1 and output disk 2 are arranged so that their toroidal curved surfaces 1a, 2a face each other.

A pair of power rollers 3 disposed on either side of the input shaft 20 are gripped between the surfaces 1a and 2a.

In order to grip the power rollers 3 between the input disk 1 and output disk 2, a nut 26 is tightened at the tip of the input shaft 20. The nut 26 is tightened so that a cam disk 27 does not fall out of the input shaft 20. Cam rollers 28 are provided between the cam disc 27 and the input disk 1. The rotation of the input shaft 20 is transmitted to the input disk 1 via the cam rollers 28.

The rotation of the input disk 1 is transmitted to the output disk 2 via the power rollers 3. The cam rollers 28 generate a thrust force proportional to the transmitting torque, and grip the power rolers 3 between the input disk 1 and output disk 2.

The output disk 2 is spline jointed to the output shaft 25. An output gear 29 is fixed on the output shaft 25.

The output shaft 25 is supported by a cover 31 of the transmission case 21 via a radial thrust bearing 30. The input shaft 20 is supported by the cover 31 via a radial thrust bearing 32. The bearings 30, 32 cannot approach each other due to a spacer 33. Further, the bearings 30, 32 respectively contact an output gear 29 and the input shaft 20, and cannot move away from each other.

Therefore, the thrust force which acts on the input disk 1 and the output disk 2 due to the cam rollers 28 is cancelled at the spacers 33, and does not act on the transmission case 21.

Figure 2:
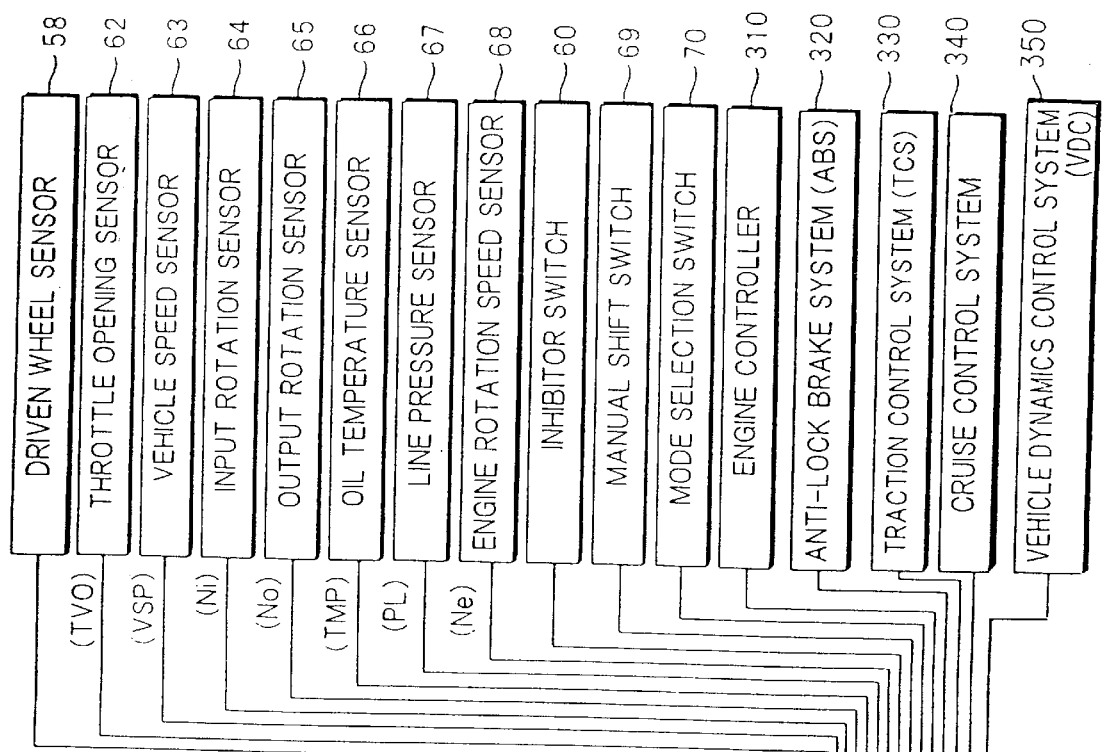
FIG. 2 is a transverse cross-sectional view of the transmission and the schematic diagram of a speed ratio control device.
Figure 2:
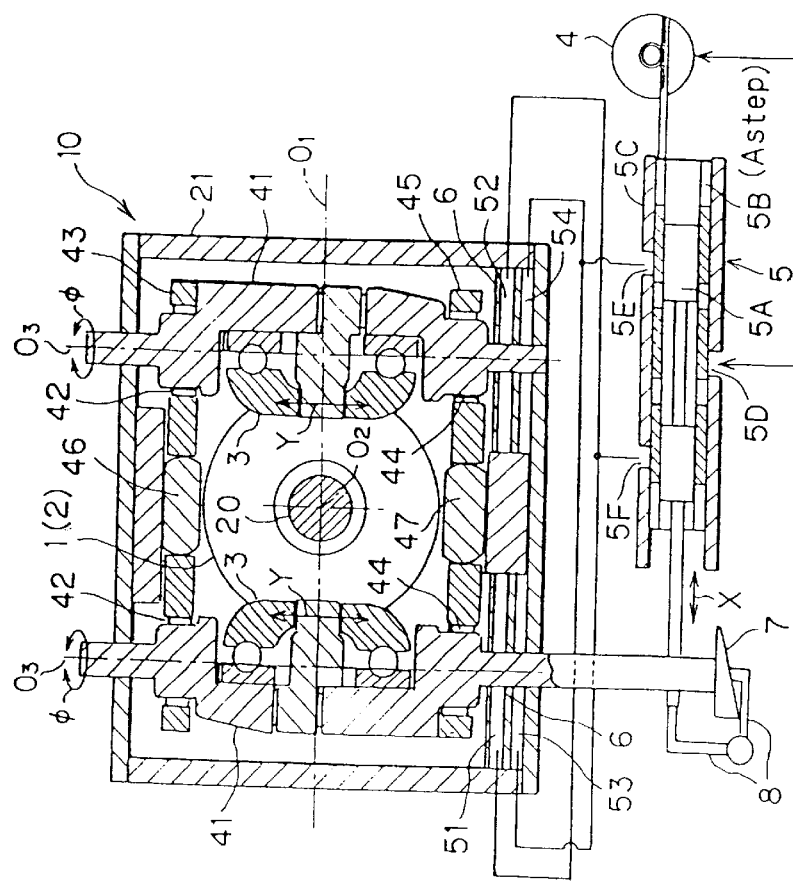

The power rollers 3 are supported free to rotate by trunnions 41, as shown in FIG. 2. The upper ends of the trunnions 41 are joined to an upper link 43 via a spherical joint 42 so that they are free to rotate and free to pivot, and their lower ends are joined to a lower link 45 via a spherical joint 44 so that they are free to rotate and free to pivot.

The upper link 43 and the lower link 45 are supported with their centers free to pivot on spherial joints 46, 47, and the trunnions 41 can be displaced vertically in synchronism in mutually opposite directions.

The speed ratio control device of the aforesaid transmission 10 will now be described referring to FIG. 2.

A piston 6 for displacing the trunnion 41 in a vertical direction is provided at each trunnion 41. Upper chambers 51, 52 and lower chambers 53, 54 are respective formed on either side of these pistons 6. A speed ratio control valve 5 for controlling the displacement of each piston 6 is provided.

The speed ratio control valve 5 comprises a spool 5A, sleeve 5B and valve case 5C. The spool 5A and sleeve 5B fit together so that they are free to slide relative to each other. The sleeve 5B fits in a valve case 5C so that they are flee to slide relative to each other.

A port 5D of the speed ratio control valve 5 is connected to a pressure source 55. A port 5E of the speed ratio control valve 5 is connected to the piston chambers 51, 54. A port 5F is connected to the piston chambers 52, 53.

The spool 5A operates together with a precess cam 7 fixed to the lower end of one of the trunnions 41 via a link 8. The sleeve 5B is engaged with a step motor 4 by a rack and pinion.

An operating command to the speed ratio control valve 5 is supplied as a displacement to the outer sleeve 5B by the step motor 4.

If the sleeve 5B displaces from the neutral position relative to the spool 5A due to this operating command, for example to the position shown in FIG. 2, the speed ratio control valve 5 will open, a fluid pressure (line pressure PL) will be supplied to the chambers 52, 53 from the pressure source 55, and the other chambers 51, 54 will be drained. The trunnions 41 then displace in mutually opposite directions up and down due to the pistons 6.

On the other hand, if the sleeve 5B displaces from the neutral position relative to the spool 5A in the reverse direction, the speed ratio control valve 5 will open, a fluid pressure will be supplied to the chambers 51, 54 from the pressure source 55, and the other chambers 52, 53 will be drained. The trunnions 41 then displace in mutually opposite directions up and down due to the pistons 6, 6.

As a result, the power rollers 3 are offset from the position where the rotation axis shaft $O_1$ intercepts the rotation axis $O_2$ of the disks 1 and 2. The offset power rollers 3 receive a force from the disks 1 and 2, and gyrate around the rotation axis $O_3$ which is perpendicular to the axis $O_1$ so as to realize continuous variable speed change.

The precess cam 7 provided on a lower end of one of the trunnions 41 performs mechanical feedback of an offset Y and gyration angle φ of the trunnion 41 and power roller 3 as a displacement X of the spool 5A via the link 8.

When a speed ratio command value corresponding to a command value A step to the step motor 4 is achieved by a continuously variable speed change, the spool 5A is returned to the neutral position relative to the sleeve 5B by the aforesaid mechanical feedback. Simultaneously, the power rollers 3 are returned to a position where the rotation axis $O_1$ intersects the rotation axis $O_2$ of the disks 1 and 2, thereby maintaining the aforesaid speed ratio command value.

In order to make the gyration angle φ of the power roller 3 a value corresponding to the speed ratio command value, it is sufficient for the precess cam 7 to feed back the gyration angle φ of the power roller 3. However, in order to prevent the speed ratio control from hunting, the offset Y of the power roller 3 is also fed back.

The command value Astep to the step motor 4 is determined by the controller 61.

The controller 61 comprises a microprocessor, read only memory, random access memory and input/output interface, and the following signals are input to the controller 61 as shown in FIG. 2.

driven wheel speed signal from a driven wheel speed sensor 58 throttle opening signal TVO from a throttle opening sensor 62 sensor detected vehicle speed signal VSP from a vehicle speed sensor 63 transmission input rotation speed signal Ni (or engine rotation speed signal Ne) from an input rotation sensor 64 transmission output rotation speed signal No from an output rotation sensor transmission oil temperature signal TMP from an oil temperature sensor 66 line pressure signal PL from a line pressure sensor 67 engine rotation speed signal Ne from an engine rotation speed sensor 68 shift lever position signal from an inhibitor switch 60 up-shift signal and down-shift signal from a manual shift switch 69 selected mode signal from a mode selection switch 70 torque-down signal from an engine controller 310 signal showing an operating state of an anti-lock brake system (ABS) 320 from the anti-lock brake system 320 signal showing an operating state of a traction control system (TCS) 330 from the traction control system 330.

auto-cruise signal from a cruise control system 340 signal showing an operating state of a vehicle dynamics control system (VDC) 350 from the vehicle dynamics system 350.

Here, as the line pressure PL is controlled by the controller 61, it is usually detected from an internal signal of the controller 61. The vehicle speed sensor 63 detects the vehicle speed from a rotation speed of, for example, the output shaft of a transmisson 10, a drive shaft or a driving wheel.

The controller 61 computes the command value Astep to the step motor 4 on the basis of the aforesaid input signals.

Figure 3:
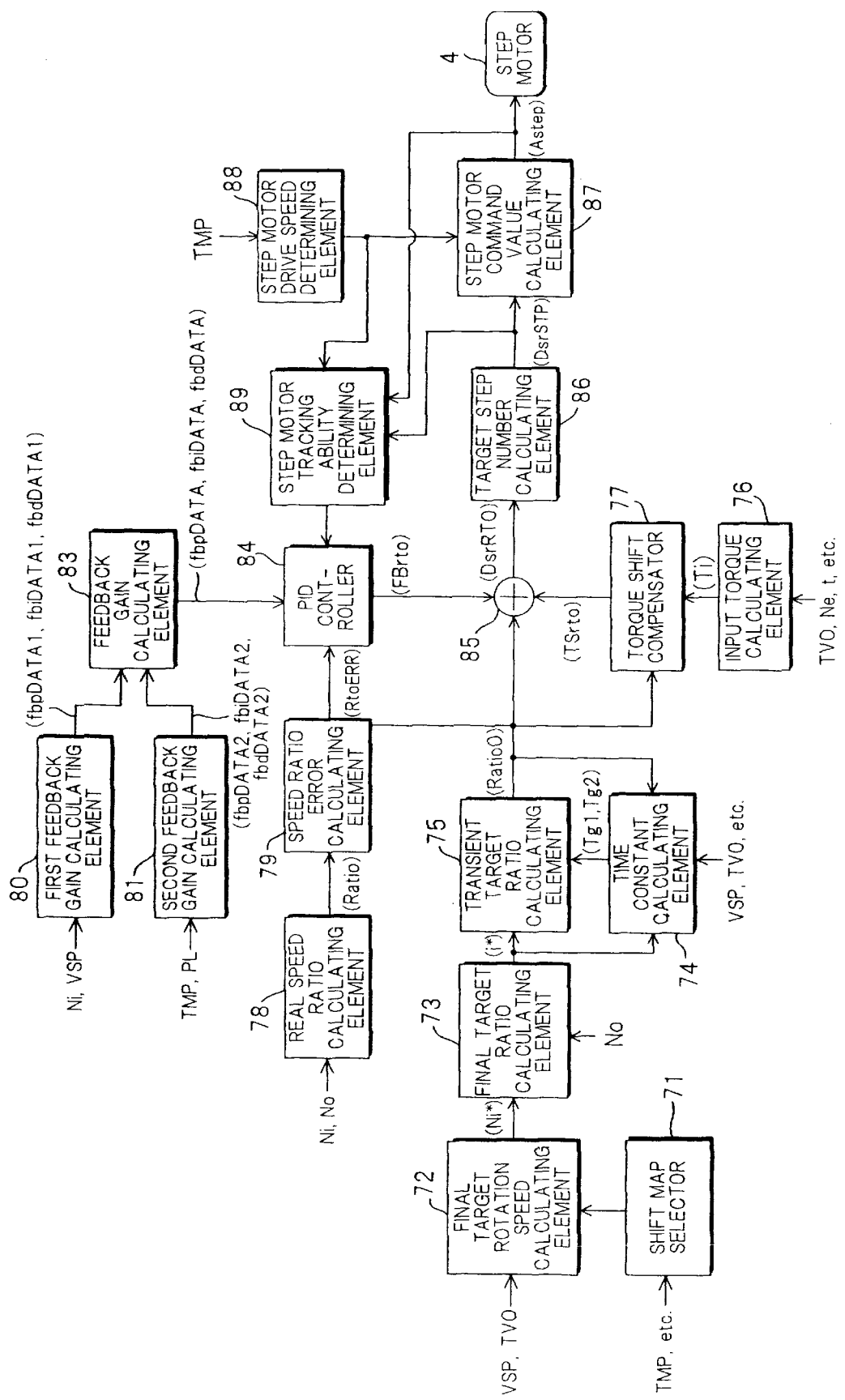
FIG. 3 is a block diagram of a controller of the speed ratio control device.

The controller 61 comprises the elements shown in FIG. 3. These elements actually comprise a computer program stored by the memory of the controller 61 or an electronic circuit of the controller 61.

Figure 4:
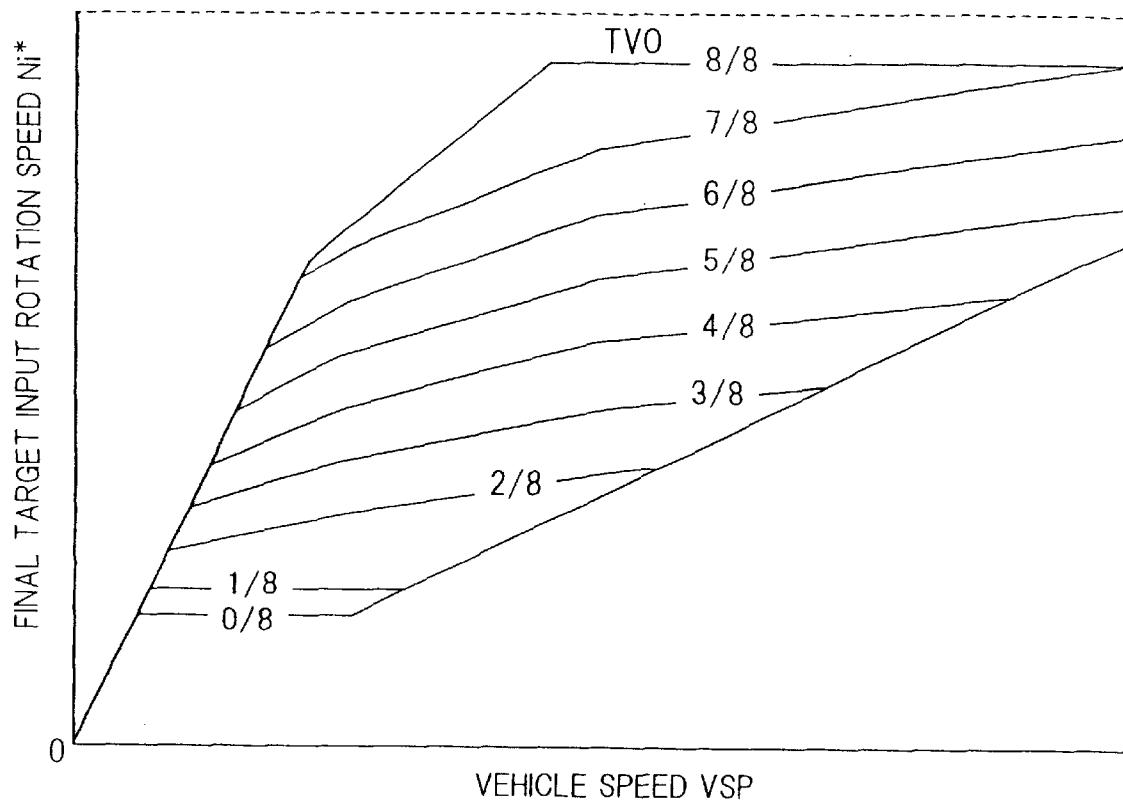
FIG. 4 is an example of a shift map used for speed ratio control.

A shift map selector 71 selects a map to be used from among plural pre-prepared maps depending on the transmission oil temperature TMP, and whether or not an exhaust gas purification catalyst has activated. FIG. 4 is an example of a shift map.

A final target input rotation speed calculating element 72 calculates a final target input rotation speed Ni* by looking up the shift map shown in FIG. 4 based on the throttle opening TVO and vehicle speed VSP. The final target rotation speed Ni* is the target value of the input rotation speed in the steady running state.

A final target ratio calculating element 73 calculates a final target ratio i* by dividing the final target input rotation speed Ni* by the transmission output rotation speed No. The final target ratio i* is the target value of the speed ratio in the steady running state.

A time constant calculating element 74 determines a first speed change time constant Tg1 and second speed change time constant Tg2 used in speed change control according to the shift lever position (the normal running position "D" or sports running position "Ds", etc.), vehicle speed VSP, throttle opening TVO, engine rotation speed Ne, accelerator pedal depression rate, the torque-down signal, the anti-lock brake control signal, the traction control signal, the autocruise signal, the vehicle dynamics control signal (VDC signal) and a speed ratio difference RtoERR between the real speed ratio Ratio and a transient target ratio Ratio0 described later, and computes a difference Eip between the final target ratio i* and transient target ratio Ratio0.

The first speed change time constant Tg1 and second speed change time constant Tg2 which are determined corresponding to a second order delay of the toroidal CVT 10, determine the speed change response relative to the final target ratio i*, and determine a speed change rate.

A transient target ratio calculating element 75 computes the transient target ratio Ratio0 and an intermediate speed ratio Ratio00 for bringing a real speed ratio Ratio close to the final target ratio i* with a speed response defined by the first speed change time constant Tg1 and second speed change time constant Tg2, and outputs the transient target ratio Ratio0.

An input torque calculating element 76 calculates a transmission input torque Ti. First, the input torque calculating element 76 calculates the engine output torque based on the throttle opening TVO and engine rotation speed Ne. Next, a torque ratio t of the torque converter is found based on the ratio of the input rotation speed (=Ne) and output rotation speed (=Ni) of the torque converter. Finally, the output torque of the engine is multiplied by the torque ratio t to compute the transmission input torque Ti.

A torque shift compensator 77 computes a compensation amount TSrto for compensating a torque shift (speed ratio deviation) peculiar to a toroidal CVT based on the transient target ratio Ratio0 and input torque Ti of the transmission 10.

During torque transmission, the power rollers 3 are gripped between the input disk 1 and output disk 2, so the trunnions 41 deform. Due to this deformation, the position of the precess cam 7 provided on the lower end of the trunnion 41 varies, and the characterstics of the mechanical feedback system comprising the precess cam 7 and link 8 vary resulting in the aforesaid torque shift.

As the torque shift of the toroidal CVT differs according to the transient target ratio Ratio0 and transmission input torque Ti, the torque shift compensator 77 calculates the torque shift compensation amount TSro by looking up a predetermined two-dimensional map based on the transient target ratio Ratio0 and transmission torque Ti.

A real speed ratio calculating element 78 computes the real speed ratio Ratio by dividing the transmission input rotation speed Ni by the transmission output rotation speed No. A speed ratio error calculating element 79 subtracts the real speed ratio Ratio from the transient target ratio Ratio0 to compute the speed ratio error RtoERR (=Ratio0−Ratio).

A first feedback gain calculating element 80 computes a first proportional control feedback gain fbpDATA1, a first integral control feedback gain fbiDATA1 and a first differential control feedback gain fbdDATA1 according to the transmission input rotation speed Ni and vehicle speed VSP. The first feedback gains fdpDATA1, fbiDATA1 and fbdDATA1 are used when a feedback correction amount FBrto is computed by PID control described later.

The first feedback gains fbpDATA1, fbiDATA1 and fbdDATA1 are computed by looking up a predetermined two-dimensional map based on the transmission input rotation speed Ni and vehicle speed VSP.

A second feedback gain calculating element 81 computes a second proportional control feedback gain fbpDATA2, a second integral control feedback gain fbiDATA2 and a second differential control feedback gain fbdDATA2 according to the oil temperature TMP and line pressure PL of the transmission 10. The feedback gains fbpDATA2, fbiDATA2 and fdDATA2 are also used when the feedback correction amount FBrto is computed by PID control, described later.

The second feedback gains fbpDATA2, fbiDATA2 and fbdDATA2 are computed by looking up a two-dimensional rap based on the transmission oil temperature TMP and the line pressure PL.

A feedback gain calculating element 83 multiplies corresponding first feedback gains and second feedback gains so as to compute a proportional control feedback gain fbpDATA (=fbpDATA1×fbpDATA2), an integral control feedback gain fbpDATA (=fbiDATA1×fbiDATA2), and a differential control feedback gain fbdDATA (=fbdDATA1×fbdDATA2).

A PID controller 84 computes a feedback correction amount by proportional control (=RtoERR×fdpDATA), a feedback correction amount by integral control (=∫{RtoERR×fbdDATA}), and a feedback correction amount by differential control (=(d/dt){RtoERR×bdiDATA}). These three feedback correction amounts are then added to compute the feedback correction amount FBrto (=RtoERR×fbpDATA+∫{RtoERR×fbiDATA}+(d/dt){RtoERR×fbdDATA}) under PID control.

A transient target ratio corrector 85 corrects the transient target ratio Ratio0 by the torque shift compensation amount TSrto and the speed ratio feedback correction amount FBrto, and computes a compensated transient target ratio DsrRTO (=Ratio0+TSrto+FBrto).

A target step number calculating element 86 computes a target step number DsrSTP of the step motor 4 which realizes the compensated transient target ratio DsrRT0 by looking up a predetermined map.

When the step motor 4 cannot displace to the aforesaid target step number DsrSTP during one control cycle even at the maximum drive speed of the step motor 4 determined according to the transmission oil temperature TMP by a step motor drive speed determining element 88, a step motor command value calculating element 87 takes a position which can be realized at the maximum drive speed of the step motor 4 as the command value Astep to the step motor 4. On the other hand, when the step motor 4 can displace to the aforesaid target step number DsrSTP during one control cycle, the target step number DsrSTP is set to the command value Astep to the step motor 4.

Therefore, it can be considered that command value Astep is the actual position of the step motor 4.

The step motor 4 rotates in the direction and position corresponding to the command value Astep, displaces the sleeve 5B of the speed ratio control valve 5 by the rack and pinion, and changes the speed ratio of the CVT 10.

When the speed ratio corresponding to the command value Astep is attained, the spool 5A is returned to the neutral position relative to the sleeve 5B by mechanical feedback via the precess cam 7. Simultaneously, the power rollers 3 are returned to the position at which the rotation axis $O_1$ intersects the rotation axis $O_2$ of the disks 1 and 2. Thereby, the speed ratio command value is maintained.

A step motor tracking ability determining element 89 determines whether or not the step motor 4 can follow the target step number DsrSTP corresponding to the compensated transient target ratio DsrRTO. First, the determining element 89 calculates a step number difference ΔSTP between the target step number DsrSTP and the command value Astep which can be considered as the actual position. When the step number error ΔSTP is smaller than a value ΔSTPLIM which the step motor 4 can eliminate during one control cycle at the maximum drive speed of the step motor 4 determined as described above by the step motor drive speed determining element 88 (ΔSTP<ΔSTPLIM), the determining element 89 determines that the step motor 4 can follow the target step number DsrSTP corresponding to the compensated transient target ratio DsrRT0. Conversely, when the step number error ΔSTP is larger than the value ΔSTPLIM (ΔSTP≧ΔSTPLIM), it determines that the step motor 4 cannot follow the target step number DsrSTP.

When it is determined that the step motor 4 can follow the target step number DsrSTP corresponding to the compensated transient target ratio DsrRT0, the determining element 89 commands the PID controller 84 to continue the computing of the speed ratio feedback correction amount FBlo by the aforesaid PID control. On the other hand, when it is determined that the step motor 4 cannot follow the target step number DsrSTP, the determining element 89 commands the PID controller to maintain the speed ratio feedback correction amount ∫{EtoERR×fbiDATA} by integral control at its value at the time of the determination.

In the step motor command value calculating element 87, when the step motor 4 cannot displace to the target step number DsrSTP during one control cycle even at the maximum drive speed of the step motor 4, the position which can be realized at the maximum drive speed of the step motor 4 is taken as the command value Astep, and the command value Astep is used for the step motor tracking ability determination by the determining element 89 as the real position of the step motor 4. Hence, it is possible to know the real position of the step motor 4 when the tracking ability determination is performed from the command value Astep to the step motor 4. For this reason, it is unnecessary to actually detect the position of the step motor 4 to perform the tracking ability determination.

Further, in the step motor tracking ability determining element 89, when the step number error ΔSTF between the target step number DsrSTP and the actual drive position (=command value Astep) is smaller than the value ΔSTPLIM which is determined according to the maximum drive speed of the step motor 4 (ΔSTP<ΔSTPLIM), it is determined that the step motor 4 can follow the target step number DsrSTP corresponding to the compensated transient target ratio DsrRT0. Conversely, when the step number error ΔSTF is greater than the value ΔSTPLIM which is defined according to the maximum drive speed of the step motor 4 (ΔSTP≧ΔSTPLIM), it is determined that the step motor 4 cannot follow the target step number DsrSTP. Thus, the determination of the tracking ability of the step motor 4 can be performed precisely although the maximum drive speed of the step motor 4 vanes according to the oil temperature TMP, etc.

Next, the speed ratio control performed by the controller 61 will be described referring to FIGS. 5–9.

Figure 5:
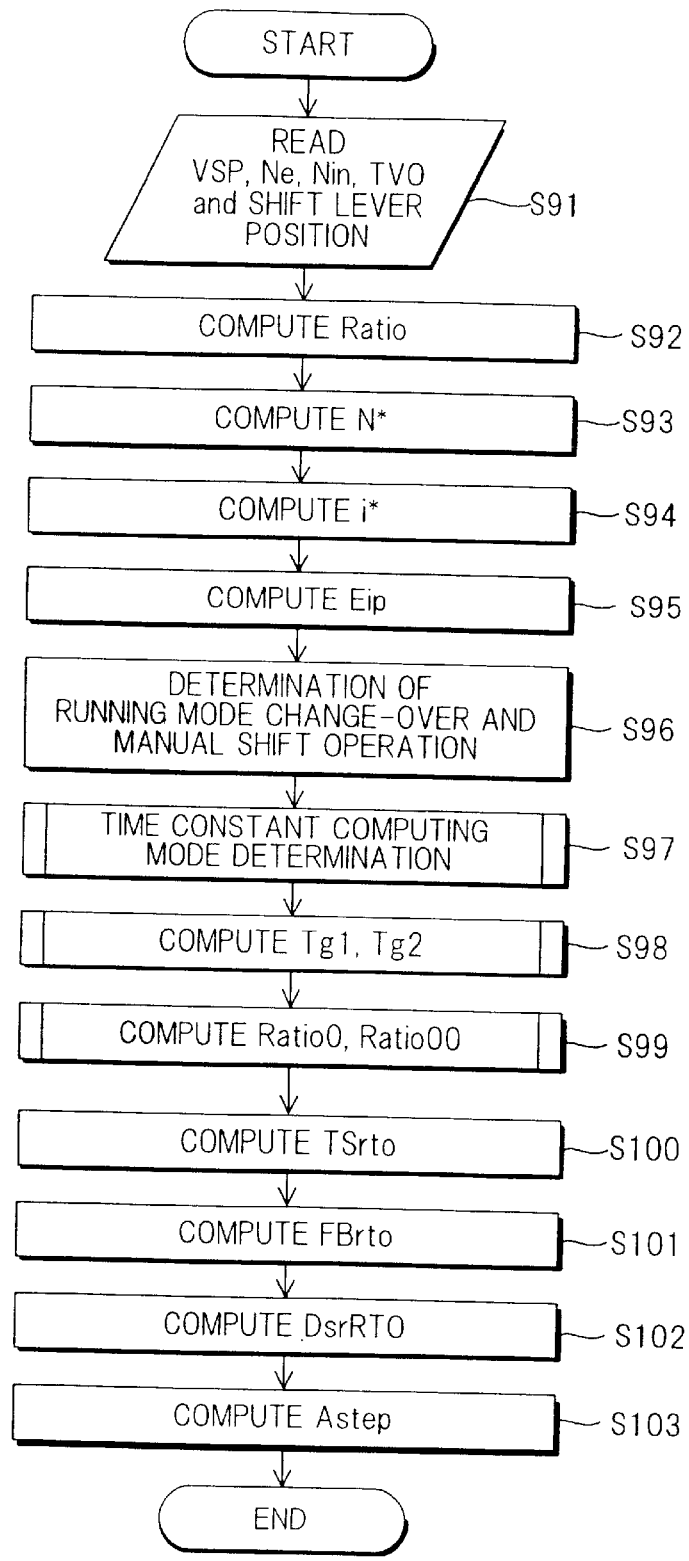
FIG. 5 is a flowchart for describing a main speed ratio control routine performed by the controller.

FIG. 5 shows the main routine of speed ratio control. This routine is performed at an interval of 10 milliseconds.

In a step S91, the vehicle speed VSP, engine rotation speed Ne, transmission input rotation speed Ni, throttle opening TVO and a shift lever position are read. The step S91 corresponds to processing of the time constant calculating element 74.

In a step S92, the real speed ratio Ratio is computed by dividing the input rotation speed Ni by the transmission output rotation speed No. The step S92 corresponds to processing by the final target input rotation speed calculating element 72.

In a step S93, the final target input rotation speed Ni* is computed based on the throttle opening TVO and vehicle speed VSP by looking up the map shown in FIG. 4. The step S93 corresponds to processing by the shift map selector 71 and the final target input rotation speed calculating element 72.

In a step S94, the final target ratio i* is computed by dividing the final target input rotation speed Ni* by the transmission output rotation speed No. The step S94 corresponds to processing by the final target ratio calculating element 73.

In a step S95, the difference Eip is computed by subtracting the transient target ratio Ratio0 computed on the immediately preceding occasion the routine was performed (this is computed at the next step S99) from the final target ratio i*. The step S95 corresponds to processing the time constant calculating element 74.

In a step S96, it is determined whether or not there has been a running mode change-over, or a manual shift operation. Specifically, it is detected whether or not there is a change-over between a power mode and a snow mode according to the signal from a mode selection switch 70. It is detected whether the shift lever is in the manual shift mode according to the signal from the inhibitor switch 60, and whether an upshift signal or downshift signal is detected from a manual shift switch 69. The step S96 also corresponds to processing by the time constant calculating element 74.

In steps S97, 98 and 99, the time constant computing mode is determined, and the first and second speed change time constants Tg1, Tg2, the transient target ratio Ratio0 and the intermediate speed ratio Ratio00 are computed, respectively. The steps S97, 98 and 99 also correspond to processing by the time constant calculating element 74.

In a step S100, the torque shift compensation amount TSrto is computed based on the transient target ratio Ratio0 and the transmission input torque Ti. The step S100 corresponds to processing by the torque shift compensator 77.

In a step S101, the feedback correction amount FBrto is computed by PID control. The step S101 corresponds to processing by the PID controller 84.

In a step S102, the torque shift compensation amount TSrto and feedback correction amount FBrto are added to the transient target ratio Ratio0 to compute the compensated transient target ratio DsrRT0. The step S102 corresponds to processing by the transient target ratio collector 85.

In a step S103, the command value Astep to the step motor 4 is computed. The step S103 corresponds to processing by the target step number calculating element 86 and the step motor command value calculating element 87.

Figure 6:
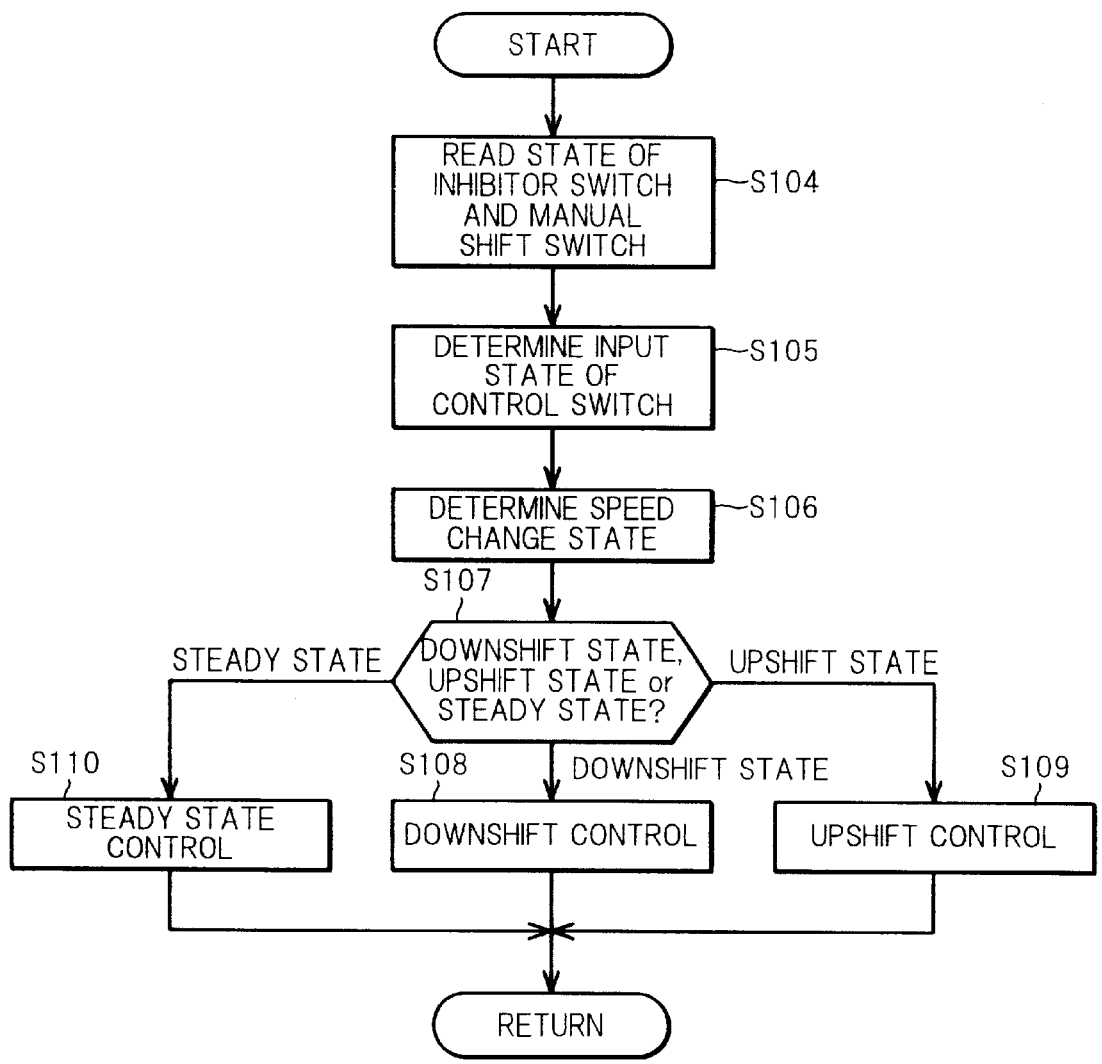
FIG. 6 is a flowchart for describing a speed ratio control routine in a manual shift mode.

FIG. 6 shows a speed ratio control routine in the manual shift mode.

In a step S104, a state of the inhibitor switch 60 and a state of the manual shift switch 69 are read In a step S105, an input state of a control switch signal (manual range signal, up signal, down signal, gate signal) is determined.

In a step S106, a speed change state in the manual shift mode (downshift state, upshift state, steady state) is determined.

In a step S107, it is determined whether the speed change state is the downshift state, upshift state or steady state based on the manual range signal, and a combination of the up signal, down signal and gate signal on the immediately preceding occasion and the present occasion.

Figure 7:
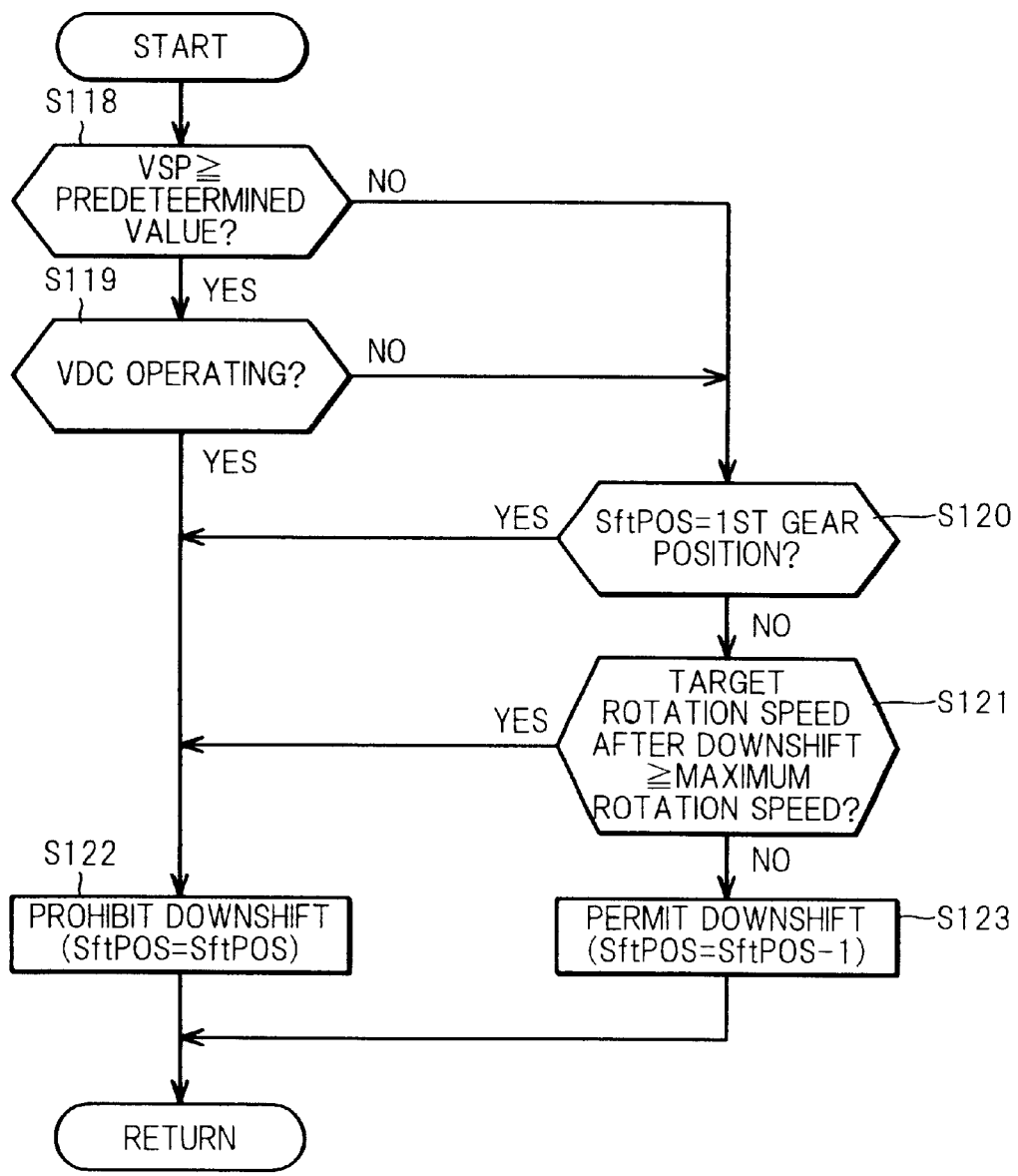
FIG. 7 is a flowchart for describing a downshift control subroutine in the manual shift mode.

When it is determined in the step S107 that the vehicle is in the downshift state, wherein the down signal is ON, the routine proceeds to a step S108, and the downshift control shown in FIG. 7 is performed.

Figure 8:
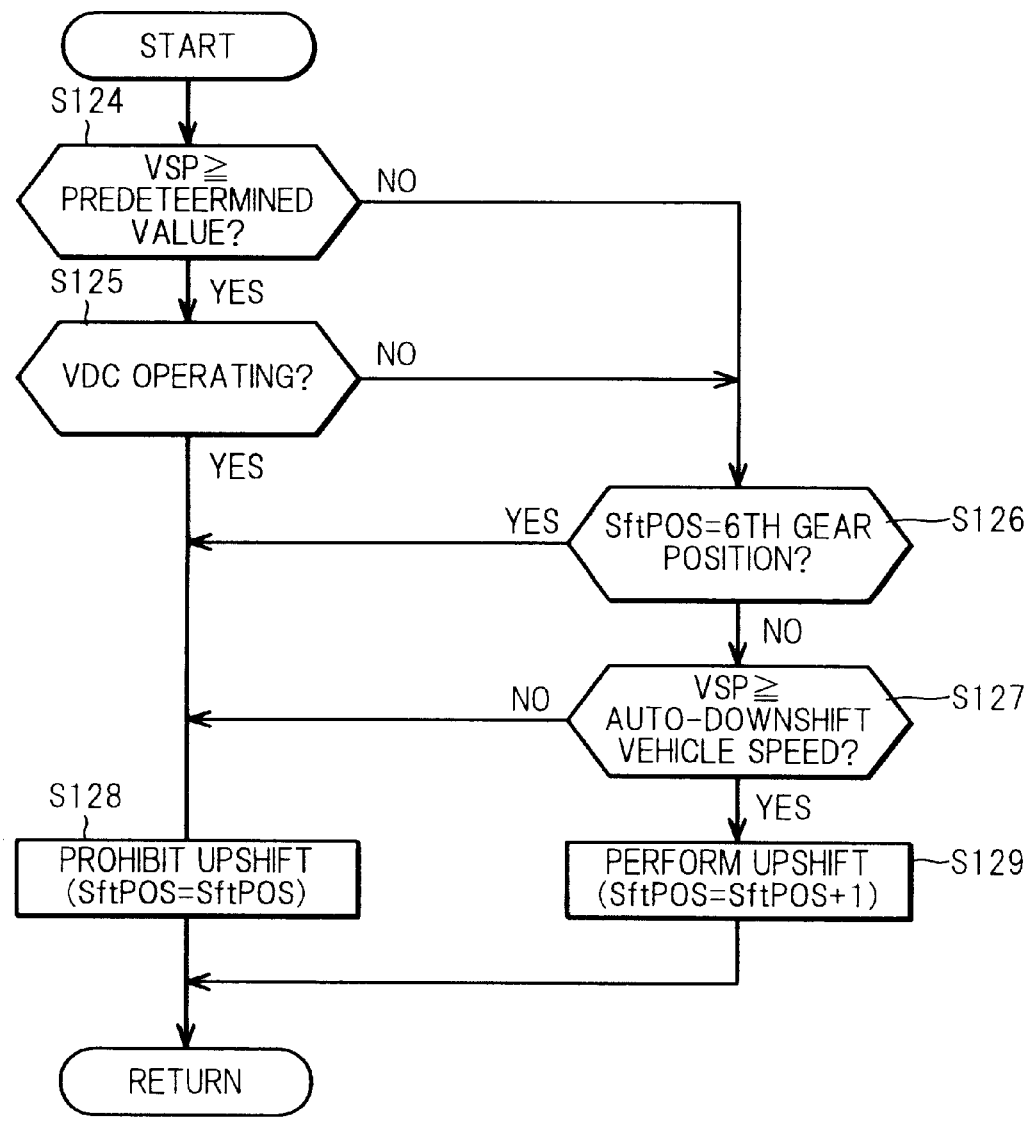
FIG. 8 is a flowchart for describing an upshift control subroutine in the manual shift mode.

When it is determined in the step S107 that the vehicle is in an upshift state wherein the up signal is ON, the routine proceeds to a step S109, and the upshift control shown in FIG. 8 is performed.

Figure 9:
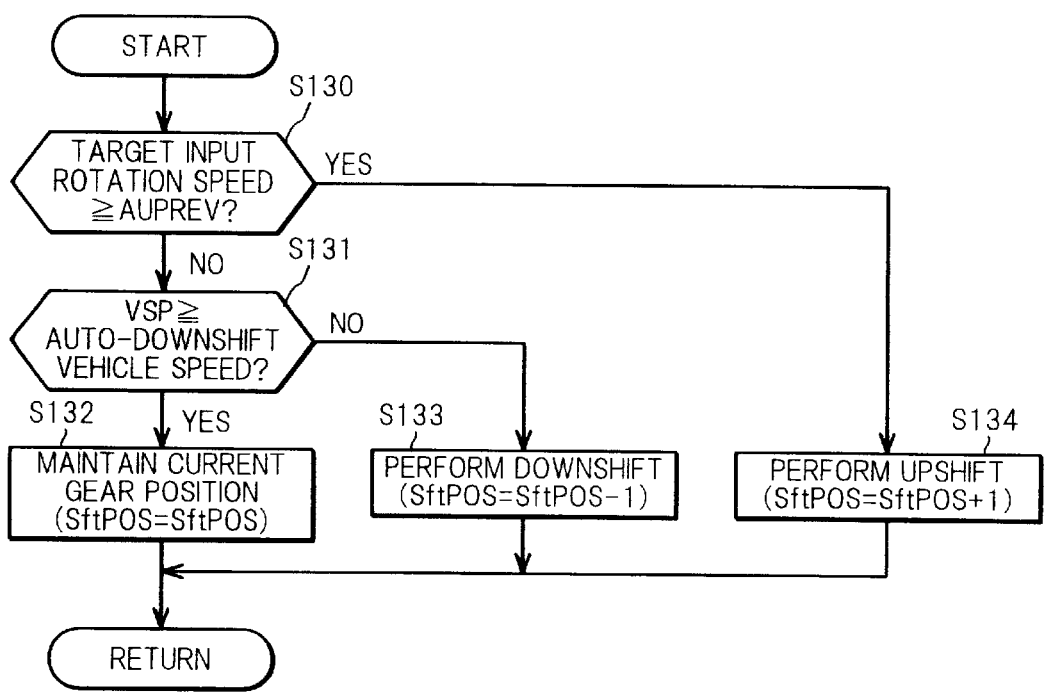
FIG. 9 is a flowchart describing a steady state control subroutine in the manual shift mode.

On the other hand, when it is determined in the step S107 that the vehicle is in neither the downshift state nor the upshift state, the routine proceeds to a step S110, and the steady state control shown in FIG. 9 is performed.

FIG. 7 shows a downshift control subroutine in the manual shift mode.

In a step S118, it is determined whether or not the vehicle speed VSP is greater than a predetermined value. If it is greater, the routine proceeds to a step S119, and if it is not greater, the routine proceeds to a step S120.

In the step S119, it is determined whether or not the VDC 350 is operating. The VDC 350 adjusts the braking of the wheels and adjusts engine output when the vehicle'swaying or rolling increases, and suppresses unstable vehicle behavior. When the VDC 350 is operating, the routine proceeds to a step S122, and downshift is prohibited. Thus, downshift is not performed while the VDC 350 is operating, and the vehicle behavior control performance of the VDC 350 is not reduced.

When the VDC 350 is not operating, the routine proceeds to a step S120, and it is determined whether or not a gear position SftPOS of the transmission 10 is the first gear position (largest speed ratio).

If the gear position is the first gear position, the routine proceeds to the step S122, and if it is not, the routine proceeds to the step S121. As downshift cannot be performed to a lower gear when the gear position is the first gear position, downshift is prohibited in the step S122.

When the gear position is not the first gear position, the routine proceeds to the step S121. In a step S121, it is determined whether or not the target input rotation speed of the transmission 10 when a downshift has been performed from the current gear position exceeds a maximum rotation speed. If it exceeds the maximum rotation speed, the routine proceeds to the step S122 and engine over speed is prevented by prohibiting downshift.

If the target input rotation speed does not exceed the maximum rotation speed, the routine proceeds to a step S123, and a downshift from the present gear position to a gear position one speed lower is permitted.

When it is determined in the step S118 that the vehicle speed VSP is less than the predetermined value, it is assumed that the effect of speed change is small even when the VDC 350 is operating, and downshift is permitted.

FIG. 8 shows an upshift control subroutine in the manual shift mode.

In a step S124, it is determined whether or not the vehicle speed VSP is greater than a predetermined value. If it is greater, the routine proceeds to a step S125, and if it is not greater, the routine proceeds to a step S126.

In the step S125, it is determined whether or not the VDC 350 is operating. When it is operating, the routine proceeds to a step S128 and an upshift is prohibited. Hence, an upshift is prohibited when the VDC 350 is operating, so vehicle behavior control performance is not reduced.

When on the other hand the VDC 350 is not operating, the routine proceeds to the step S126, and it is determined whether or not the current gear position SftPOS is the sixth gear position smallest speed ratio).

When the gear position is the sixth gear position, an upshift to a higher gear position is impossible, the routine proceeds to a step S128, and upshift is prohibited.

On the other hand, if it is not, the routine proceeds to a step S127. In the step S127, it is determined whether or not the vehicle speed VSP is greater than an auto-downshift vehicle speed computed based on the target gear position SftPOS. If it is greater, the routine proceeds to a step S129. If it is not, the routine proceeds to the step S128, and interference between upshift and auto-downshift is prevented by prohibiting upshift In the step S129, an upshift is performed which changes the gear position to a gear position one speed higher than the present gear position.

FIG. 9 shows a steady state control subroutine in the manual shift mode.

In a step S130, it is determining whether or not the target input rotation speed is greater than an auto-upshift rotation speed AUPREV. If it is greater, the routine proceeds to a step S134, and over speed of the engine is prevented by performing an upshift automatically.

When the target input rotation speed is less than the auto-upshift rotation speed AUPREV, the routine proceeds to a step S131, and it is determined whether or not the vehicle speed VSP is greater than an auto-downshift vehicle speed computed based on the target gear position SftPOS. If it is greater, the routine proceeds to a step S132, and the current gear position is maintained.

However, if it is not greater, the routine proceeds to a step S133, and a downshift is performed automatically. In this auto-downshift control, as the continuously variable transmission 10 cannot change the speed ratio when the vehicle is stationary, it is performed so that the speed ratio is changed to the largest ratio by the time the vehicle stops.

In this way, when it is determined that the VDC 350 is operating while the vehicle is running in the manual shift mode, downshift and upshift are prohibited. By prohibiting downshift and upshift when the VDC 350 is operating, disturbance to control due to speed change is eliminated and the vehicle behavior control performance of the VDC 350 is not reduced.

When the VDC 350 is operating, a manual upshift operation or downshift operation in the manual shift mode is itself ineffectual. Therefore, when the VDC 350 stops and the prohibition of speed change operations is canceled, a speed change according to the shift operation during the ineffectual period is not performed.

On the other hand, when the VDC 350 is not operating and the vehicle is considered to be running stably, speed change control by a manual operation is permitted, and the driver is able to perform speed change operations freely as he wishes in the manual shift mode.

When a continuously variable transmission is provided, in the automatic continuously variable shift mode, the torque fluctuation is smaller than a stepwise speed change even if the speed ratio changes, so there is no particular need to prohibit speed change operations even during operation of the VDC 350.

The speed ratio control when the vehicle is running in the manual shift mode and the ABS 320, TCS 330 or VDC 350 is operating, is as follows:

[When the ABS 320 is operating]
 the gear position is changed to a gear position one speed higher
 a manual shift operation is effective
 auto-downshift is performed based on the vehicle speed (driven wheel speed)

[When the TCS 330 is operating]
 a manual shift operation is effective
 auto-upshift is performed based on the vehicle speed (driven wheel speed) detected by vehicle speed sensor 63

[When the VDC 350 is operating]
 a manual shift operation is ineffectual
 auto-downshift or auto-upshift is performed based on the vehicle speed (drive wheel speed)

As is clear from the above, when the ABS 320 or TCS 330 operates causing an acceleration or deceleration in the back and forward direction unaccompanied by vehicle motion in the yaw direction or roll direction, as when the vehicle is starting, accelerating or braking, a manual shift operation is effective. The manual shift operation is made ineffectual only when the VDC 350 is operating accompanied by vehicle motion in the yaw direction or roll direction.

Another embodiment of this invention will now be described.

In the first embodiment, the case was described of a continuously variable transmission having a manual shift mode, but the second embodiment is a case of applying this invention to an automatic transmission wherein the gears are changed over automatically between plural gear positions according to the vehicle running state.

Figure 10:
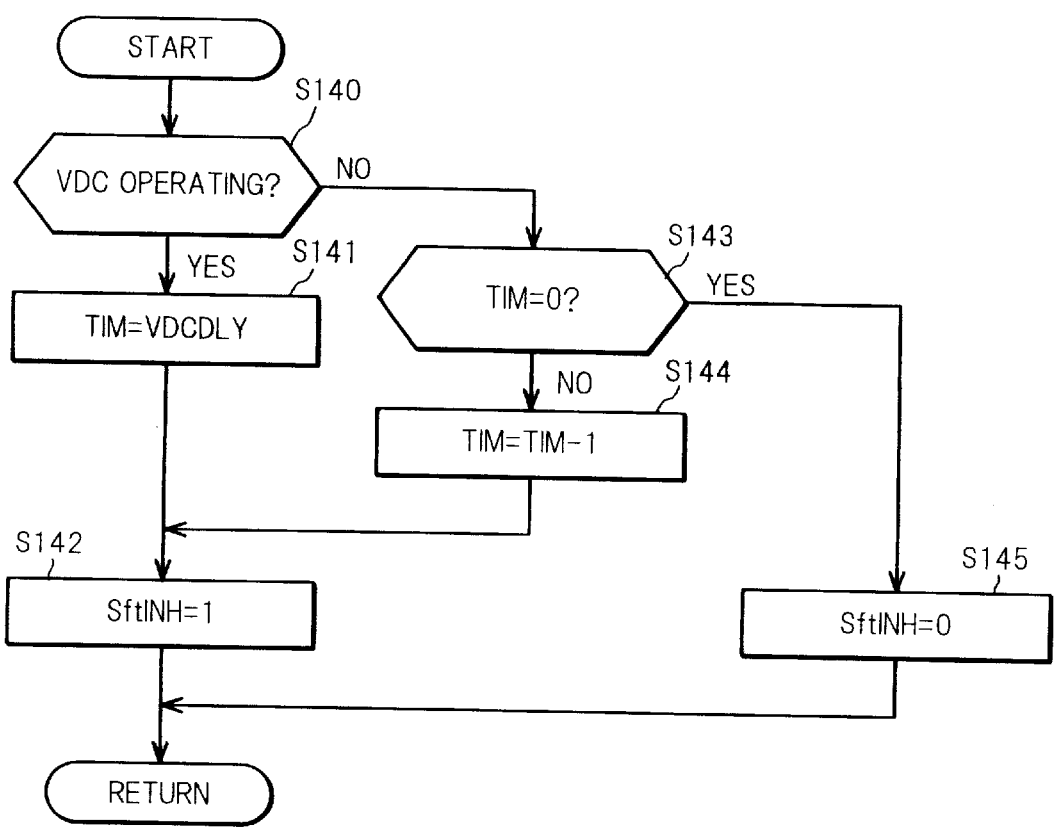
FIG. 10 is a flowchart for describing a speed ratio prohibition control routine in the second embodiment according to this invention.

FIG. 10 shows a speed change prohibition routine.

In a step S140, it is determined whether or not the VDC 350 is operating. When it is operating, the routine proceeds to a step S141, and when it is not operating, the routine proceeds to a step S143.

In the step S141, a delay timer TIM which is the delay time until speed change prohibition is canceled, is set to a value VDCDLY.

Next, in a step S142, a speed change prohibition flag SftINH is set to "1" showing that speed change is prohibited.

When it is determined in the step S140 that the VDC 350 is not operating, it is determined in the step S143 whether or not the delay timer TIM is zero. If it is not zero, the routine proceeds to a step S144, and if it is zero, the routine proceeds to a step S145. In the step S144, the delay timer TIM is decremented and the routine proceeds to the aforesaid step S142.

On the other hand, when TIM is zero in the step S143, i.e., when the delay time has elapsed since the VDC 350 stopped operating, the speed change prohibition flag SftINH is cleared to zero the step S145.

Figure 11:
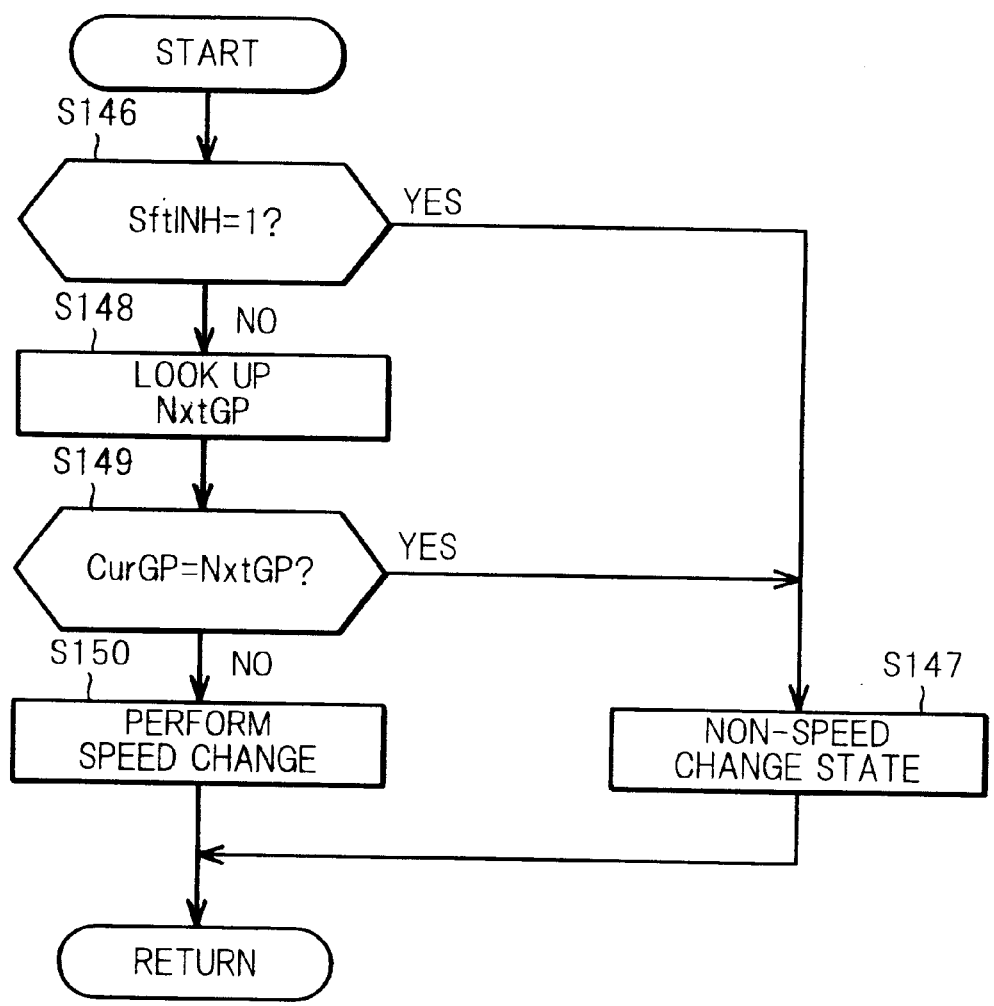
FIG. 11 is a flowchart for describing a speed change control routine in the second embodiment.

FIG. 11 shows a speed change process.

In a step S146, it is determined whether or not the speed change prohibition flag SftINH is "1". If the flag SftINH is "1", the routine proceeds to a step S147, and if the flag SftINH is not "1", the routine proceeds to a step S148.

In the step S147, the vehicle enters a non-speed change state where speed change is not performed.

On the other hand, when the vehicle is not in the speed change prohibition state (SftINH=0), in a step S148, a target gear position NxtGP is looked up from a preset shift map based on the vehicle speed VSP and the throttle opening TVO. In the step S149, the need for a speed change is determined for whether or not a current gear position CurGP coincides with the target gear position NxtGP. If it coincides, the routine proceeds to a step S147, and if it does not coincide, the routine proceeds to a step S150.

In the step S150, a speed change process which gives the target gear position NxtGP is performed.

In this way, when the VDC 350 is operating, speed change operations are prohibited, behavior control of VDC 350 is given priority, and interference between the speed change and the operation of VDC 350 is prevented. When the VDC 350 stops operating, the speed change prohibition is canceled after a predetermined delay time has elapsed, and normal automatic speed ratio control is performed. The reason why speed change prohibition is cancelled after the delay time elapsed, is because the vehicle does not always start running stably immediately after the VDC 350 has stopped. The VDC 350 may even start operating again immediately after it has stopped. By providing the delay time, repetition of the prohibition and cancellation of speed change is prevented, and the frequency of speed change while the vehicle is in an unstable running state is decreased.

This invention is not limited to the aforesaid embodiments, various modifications and amendments being possible. The present invention is also applied to a vehicle comprising V-belt CVT. The VDC may control the vehicle behavior by controlling the drive force distribution between the vehicle'front and rear wheels or left and right wheels.

The entire contents of Japanese Patent Applications P11-280362 (filed Sep. 30, 1999), P11-280417 (filed Sep. 30, 1999) and P11-280418 (filed Sep. 30, 1999) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. A speed ratio control device for use with a vehicle provided with an automatic transmission and a behavior control device which controls either of yawing and rolling of the vehicle, comprising:

an actuator which changes a speed ratio of the transmission; and a microprocessor programmed to:

determine whether or not vehicle behavior control device is operating;

prohibit any speed change operation by the actuator when the vehicle control device is operating; and execute a speed change operation by the actuator based on a running state or driver's operations when the vehicle behavior control device is not operating.

2. A speed ratio control device as defined in claim 1, wherein the vehicle behavior control device controls the yaw rate of the vehicle so that the yaw rate of the vehicle follows a target yaw rate.

3. A speed ratio control device as defined in claim 1, wherein the microprocessor is further programmed to:

prohibit any speed change operation by the actuator for a predetermined time after the vehicle behavior control device has stopped.

4. A speed ratio control device as defined in claim 1, wherein the microprocessor is further programmed to:

permit a speed change operation by the actuator when the vehicle speed does not exceeded a predetermined value even if the vehicle behavior control device is operating.

5. A speed ratio control device as defined in claim 1, wherein the speed change operation by the actuator which is prohibited, is a speed change operation for changing over a gear position which is automatically performed according to a running state.

6. A speed ratio control device as defined in claim 1, wherein the speed change operation by the actuator which is prohibited, is either of an upshift and downshift operation in a manual shift mode.

7. A speed ratio control device for use with a vehicle provided with an automatic transmission which controls either of yawing and rolling of the vehicle, comprising:

means for changing the speed ratio of the transmission; and means for determining whether or not the vehicle behavior control device is operating; and means for prohibiting any speed change operation by the actuator when the vehicle behavior control device is operating.

* * * * *